(12) United States Patent
Yang (10) Patent No.: US 6,803,863 B1
(45) Date of Patent: Oct. 12, 2004

(54) METHOD AND CIRCUITRY DEVICE FOR NON-LINEAR OUTPUT DISPLACEMENT CONVERSION WITH REFERENCE TO SIGNAL SPEEDS COMING FROM DISPLACEMENT DETECTOR

(76) Inventor: Tai-Her Yang, No. 59, Chung Hsing 8 St., Si-Hu Town, Dsan-Hwa (TW)

( * ) Notice: Subject to any disclaimer, the term of this patent is extended or adjusted under 35 U.S.C. 154(b) by 0 days.

(21) Appl. No.: 09/479,073

(22) Filed: Jan. 7, 2000

(51) Int. Cl.[7] ............................................... H03M 1/22
(52) U.S. Cl. ......................................... 341/11; 341/115
(58) Field of Search ........................ 341/2–16, 111–117

(56) References Cited

U.S. PATENT DOCUMENTS

| | | | |
|---|---|---|---|
| 3,987,434 A | * | 10/1976 | Endo et al. ................. 341/116 |
| 4,630,928 A | * | 12/1986 | Klingler et al. ............. 341/116 |
| 4,847,879 A | * | 7/1989 | Iijima et al. .................. 377/43 |
| 4,855,744 A | * | 8/1989 | Sayers ......................... 341/116 |
| 5,066,953 A | * | 11/1991 | Lengenfelder et al. ...... 341/155 |
| 5,079,549 A | * | 1/1992 | Liessner ..................... 341/116 |
| 5,920,494 A | * | 7/1999 | Setbacken et al. .......... 364/723 |

* cited by examiner

Primary Examiner—Howard L. William
(74) Attorney, Agent, or Firm—Bacon & Thomas, PLLC (57) ABSTRACT

A conversion device converts linear displacement signals from a displacement detector into non-linearly adjusted displacement signals for supply to a target such as a computer cursor controller. The displacement signals from the displacement detector are incremented, decremented, or left unchanged depending on displacement speeds detected by the conversion circuit.

42 Claims, 15 Drawing Sheets

METHOD AND CIRCUITRY DEVICE FOR NON-LINEAR OUTPUT DISPLACEMENT CONVERSION WITH REFERENCE TO SIGNAL SPEEDS COMING FROM DISPLACEMENT DETECTOR

BACKGROUND OF THE INVENTION (a) Field of the Invention

The invention relates to a method and circuitry device for non-linear adjustment, either incremental or decremental, of displacement signals output by a displacement detector by taking into account displacement speed in order to convert linear displacement signals into non-linear displacement signals.

(b) Description of the Prior Art

Figure 1:
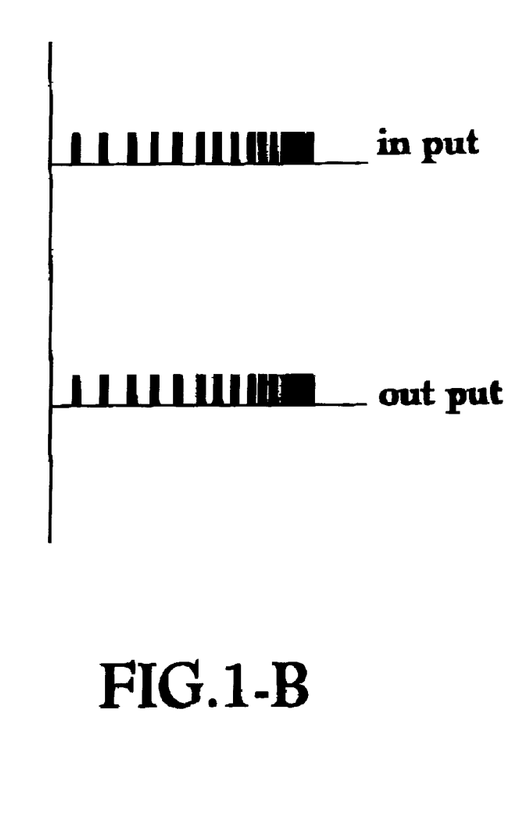

Conventionally, displacement detectors, whether manually driven or mechanically driven, find their applications essentially in the control of various electro-mechanical systems. With respect to CNC machine tools, for example, it is common for them to be equipped with a manually rotated pulse generator, whereby displacement-specific adjustment is made by manual manipulation, in a wired mode or wireless mode, or alternatively using a computer system involving cursor actuation by means of a wired or wireless mouse. The same is true of a wired or wireless mobile console in the case of a video game apparatus, or of the signal processing or power transmission control of terrestrial, maritime, or air-borne transport or other electro-mechanical systems. A point to note at this juncture is that currently practically all systems, regardless of their modes of transmission, manual or electro-mechanical, rely on signals produced by a relevant displacement detector for their control to effect relative linear displacement on the target, the displacement being controlled to increment or decrement pursuant to predetermined, fixed multiples that have nothing to do with the speed of the signal on the part of the displacement detector, as can be appreciated by referring to FIGS. 1A and 1B, which show a conventional linear displacement signal curve in response to a fixed acceleration factor. More specifically, an analog signal chart is depicted in FIG. 1-A, and a pulse signal chart is depicted in FIG. 1-B. These conventional displacement detectors usually offer analog or pulse signals reflective of the amplitude of displacement and proportionate to speeds of displacement.

SUMMARY OF THE INVENTION

The primary object of the invention is to provide a method and device for non-linear output displacement conversion with reference to signal speeds output by a displacement detector. This is the first ever breakthrough in converting displacement signals coming from a displacement detector, by means of a non-linear converter and by referencing the speeds of input signals initiating the displacement, into incremental or decremental displacement signals or data which are characteristically non-linearly proportional to the displacement speeds. The incremental or decremental displacement signals serve as outputs to drive successive stages of circuits, making possible accelerated driving of the respondent value of the output through incremental conversion, or alternatively decreased driving of the respondent value of the output through decremental conversion, thereby facilitating precise trace displacements.

BRIEF DESCRIPTION OF THE DRAWINGS

FIG. 1-A is an analog signal chart showing a curve of a linear displacement signal versus a conventional, constant acceleration;

FIG. 1-B is a pulse signal chart illustrating linear displacement signals versus a conventional constant acceleration;

FIG. 2-A is an analog signal illustration of a curve converted from high incremental rate/low decremental rate signals according to the invention;

FIG. 2-B is a graph of pulse signals converted from high incremental rate/low decremental rate signals according to the invention;

FIG. 3-A is a graph of analog signals converted from high incremental rate/constant decremental rate signals according to the invention;

FIG. 3-B is a graph of pulse signals converted from high incremental rate/constant decremental rate signals is according to the invention;

FIG. 4-A is a graph of analog signals converted from constant high rate/low decremental rate signals according to the invention;

FIG. 4-B is a graph of analog signals converted from constant high rate/low decremental pulse signals according to the invention;

DETAILED DESCRIPTION OF THE PREFERRED EMBODIMENTS

Figure 2:
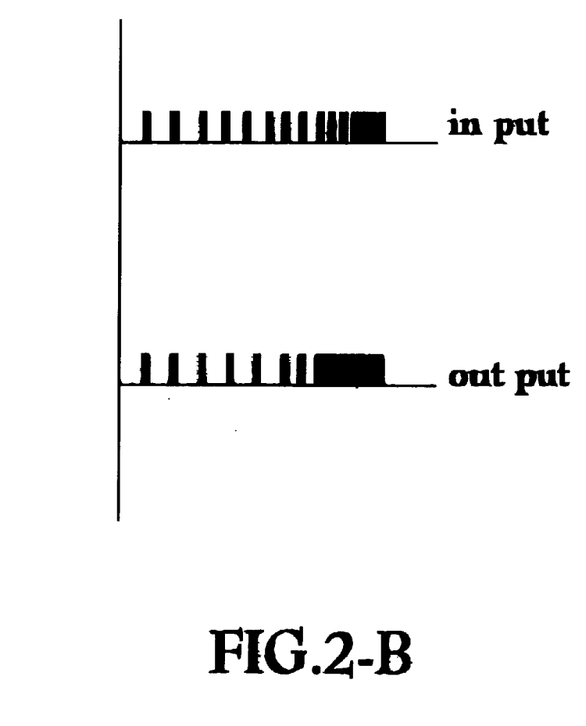
Figure 3:
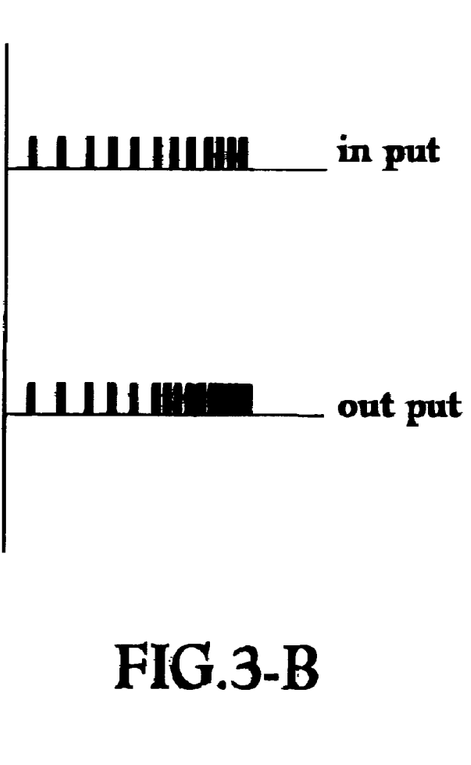
Figure 4:
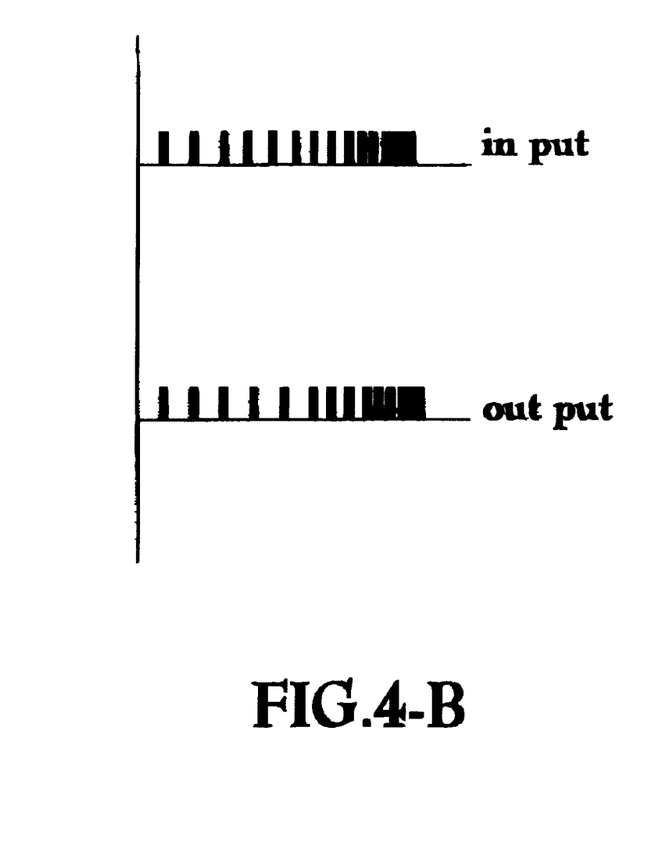

This invention is innovative in that it unprecedentedly takes as a parameter its operational displacement speed, which together with the displacement signal, is concurrently fed to a non-linear conversion system so that at a faster displacement operation speed the output is converted into a relatively set incremental displacement, while at a slower operation speed the output is converted into another relatively set incremental displacement, and at a still slower operation speed the output is converted into yet another relatively set decremental displacement, as is represented in a signal conversion curve contrasting a high speed increment vs. a low speed decrement relationship, with FIG. 2-A illustrating analog signals, and FIG. 2-B illustrating pulse signals. Alternatively, the converter may switch to increment displacement while the displacement operation is run at a faster speed, and remain constant at lower operation speeds, as shown by the signal conversion curve in FIG. 3, with FIG. 3-A showing an analog signal chart, and FIG. 3-B showing a pulse signal chart; or else the output characteristic may be such that displacement is made constant while the operation displacement shifts fast, but decremental when the displacement turns slow, a signal conversion curve to such effect being shown in FIG. 4, with FIG. 4-A showing an analog signal chart, and FIG. 4-B showing a pulse signal curve.

Figure 5:
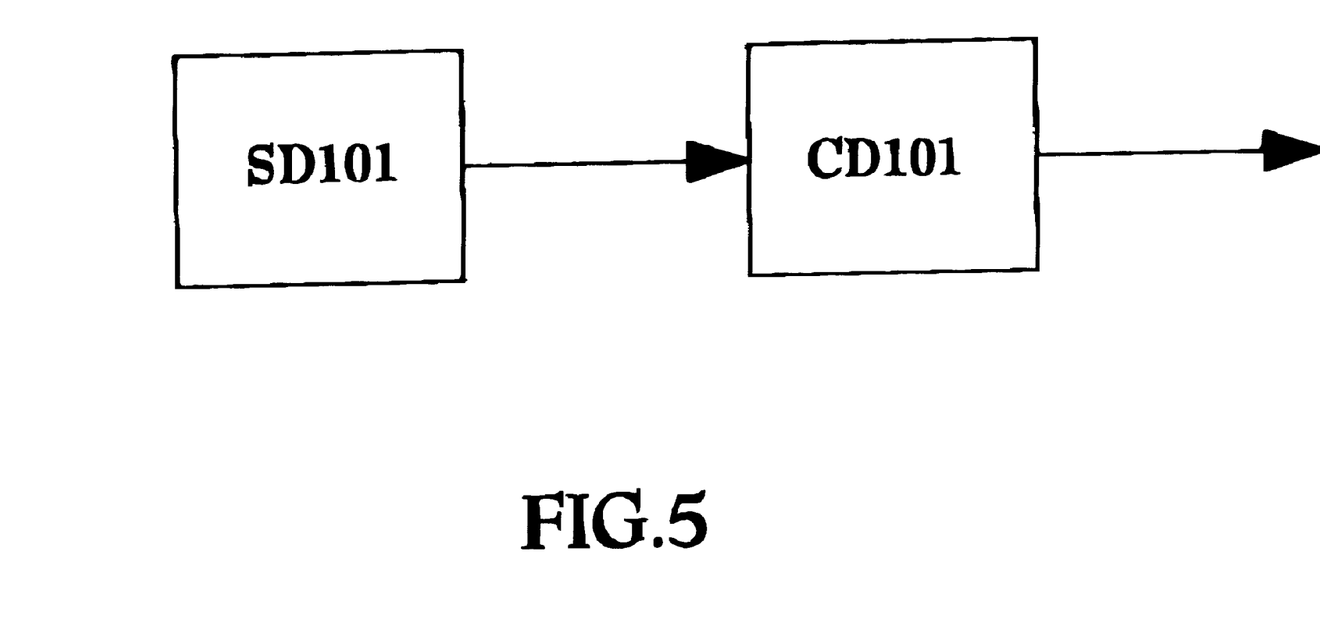
FIG. 5 is a block diagram of the key circuits constituting the invention.

FIG. 5 is a block diagram of the conversion device of the invention, which includes:

a displacement detector SD101 composed of solid electronic or electro-mechanical appliances that utilize optical, acoustic, electric, magnetic, or other physical effects to generate relative displacement signals whose analog signal strengths or pulse signal densities are proportional to speeds of displacements when rotatably or linearly driven by manual power or mechanical power, and to output the signals to a non-linear converter CD101, and also to convert, in reference to displacement speeds, output displacements which are non-linearly incrementing or decrementing in relation to the displacement being inputted;

a non-linear converter CD101 composed of solid-state electronics or electro-mechanical appliances and hardwarethat servers to convert both the input displacement and the analog or pulse signals which are proportional to speeds of displacements into non-linearly incrementing or decrementing analog or pulse output signals by way of interpolation circuits incorporated in or exterior to the non-linear converter; the non-linear converter itself being composed of software and associated hardware to accept input of said analog or pulse displacement signal, for conversion to incrementing or decrementing analog or pulse displacement output signals by taking as parameters the input displacement and the displacement speeds; or else for conversion of analog or pulse displacement signals into corresponding digital signals which are to be further subjected to software or digital interpolation Circuits for non-linear conversion into digital output which is relatively non-linearly incrementing or decrementing.

Figure 6:
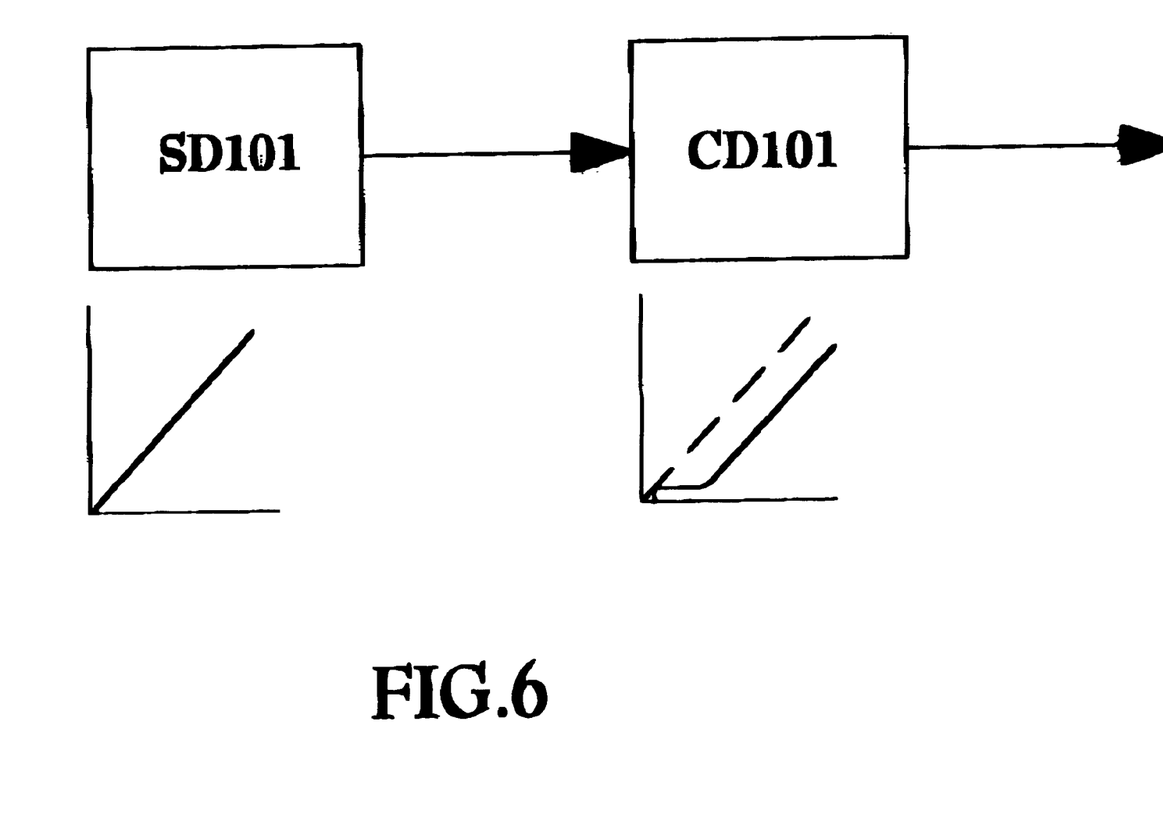
FIG. 6 is an illustration of a curve of analog detection signals converted into non-linearly incremental/decremental analog output signals according to the invention.
Figure 7:
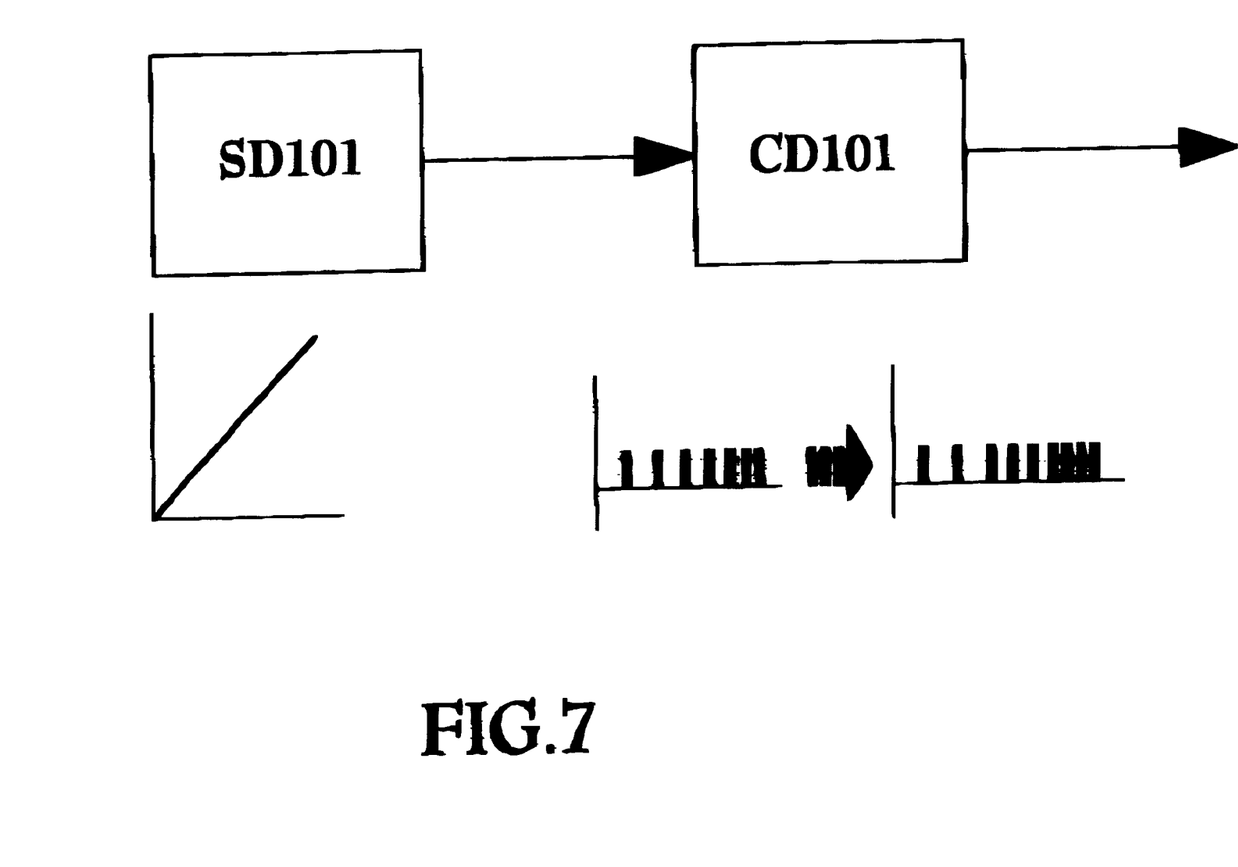
FIG. 7 is an illustration of a curve of non-linearly incrementing or decrementing pulse output signals converted from analog detection signals according to the invention.
Figure 8:
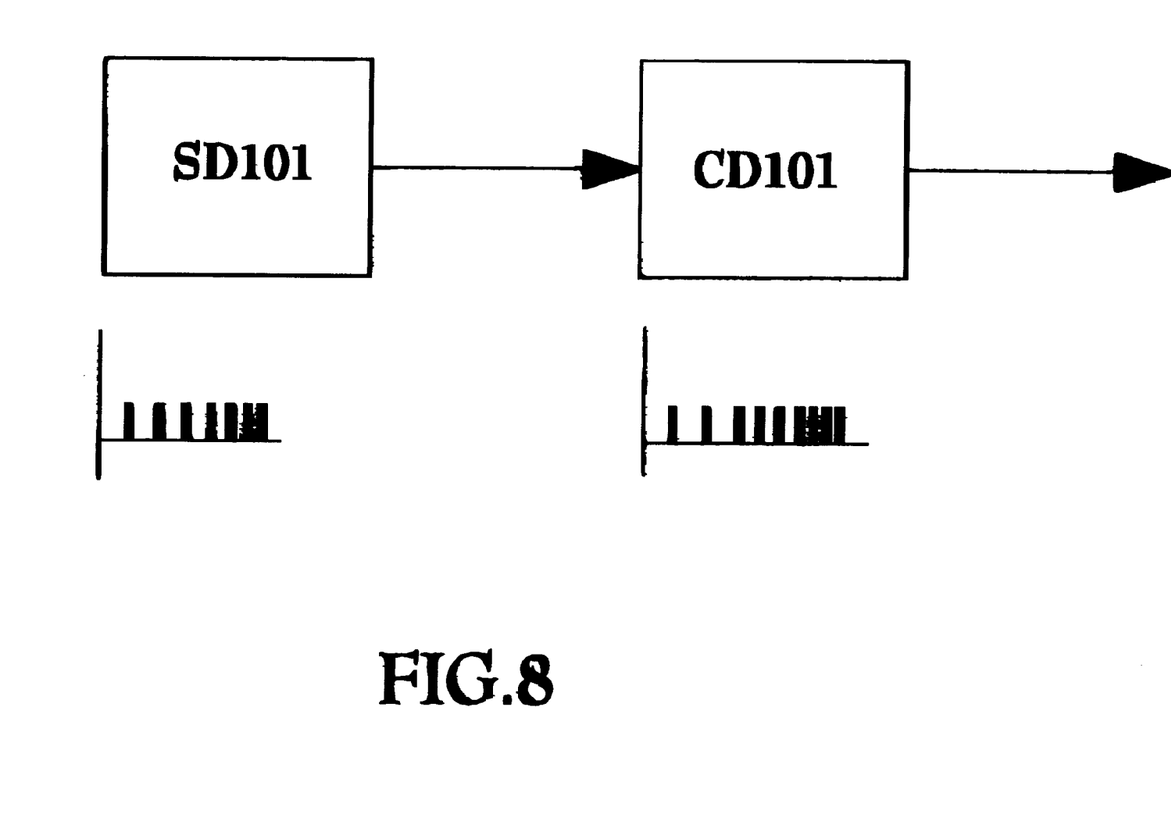
FIG. 8 illustrates a pulse output signal train of non-linear incrementing or decrementing modes converted from input pulse signals according to the invention.
Figure 9:
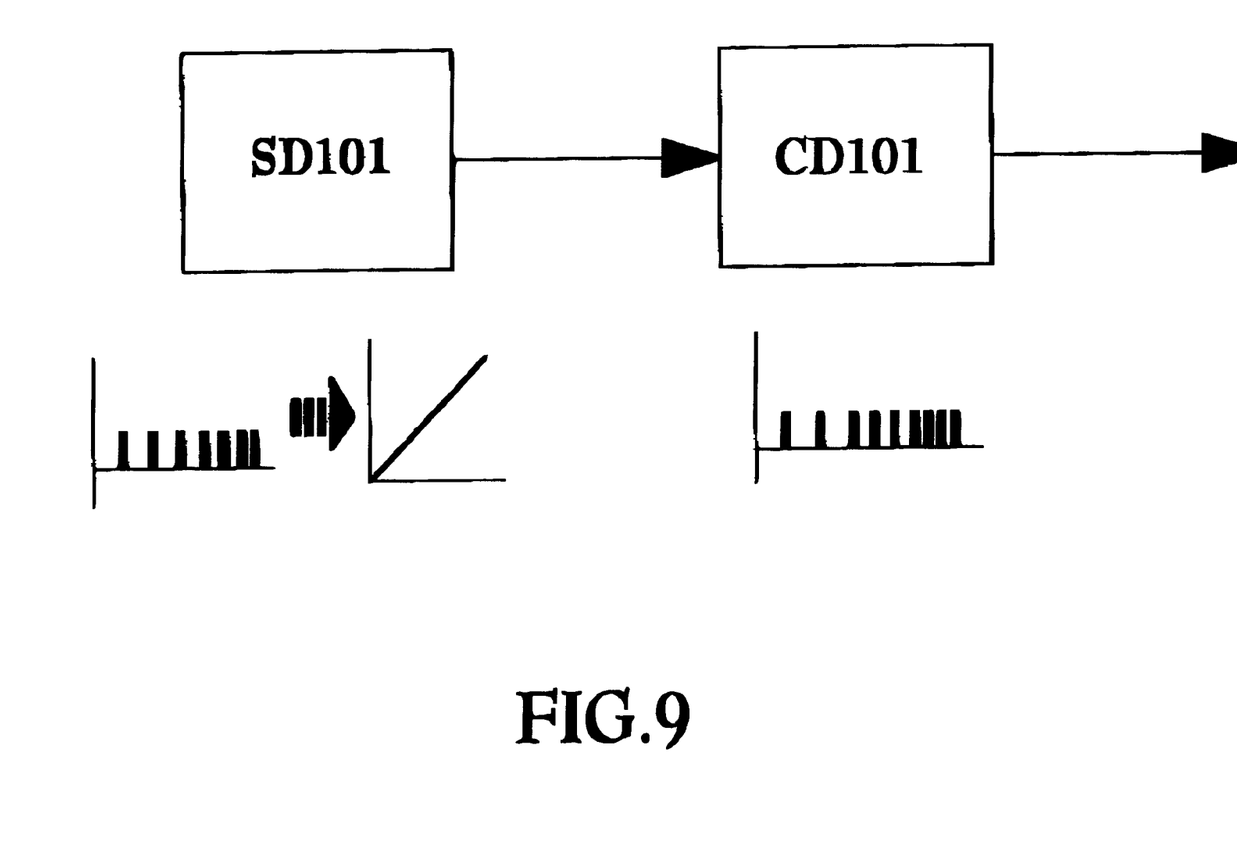
FIG. 9 illustrates an analog output signal train of non-linear incrementing or decrementing modes converted from input pulse signals.

By reason of the displacement detector, as arranged, comprising an analog mode and/or the pulse mode; with interpolation comprising analog interpolation, pulse interpolation, and digital interpolation provided by digital software or hardware; and the output signal comprising an analog output, pulse output and/or digital output, displacement detector, the makeup of said displacement detector is related to the non-linear Converter in so far as matching between both is concerned, as follows:

(1) The analog output signal of the analog displacement detector is directly matched to the analog non-linear converter, as shown in FIG. 6, to achieve conversion of the analog detection signal to a non-linear incrementing or decrementing analog output signal, according to the invention;

(2) The analog output signal coming from the analog displacement detector is converted to a correspondent pulse signal, thence matched to a pulse non-linear converter, as shown in FIG. 7, to provide an output signal having a non-linearly incrementing or decrementing mode converted from the analog detection signal, according to the invention;

(3) The pulse output signals from the pulse displacement detector are directly matched to the pulse non-linear converter, as shown in FIG. 8, illustrating pulse output signals of non-linear incrementing or decrementing mode converted from displacement pulse signals according to the invention;

(4) The pulse output signals from the pulse displacement detector are converted into correspondent analog signals, thence matched to an analog non-linear converter, as shown in FIG. 9, which graphically analog illustrates output signals of the non-linear incrementing or decrementing mode converted from pulse signals, according to the invention.

Figure 10:
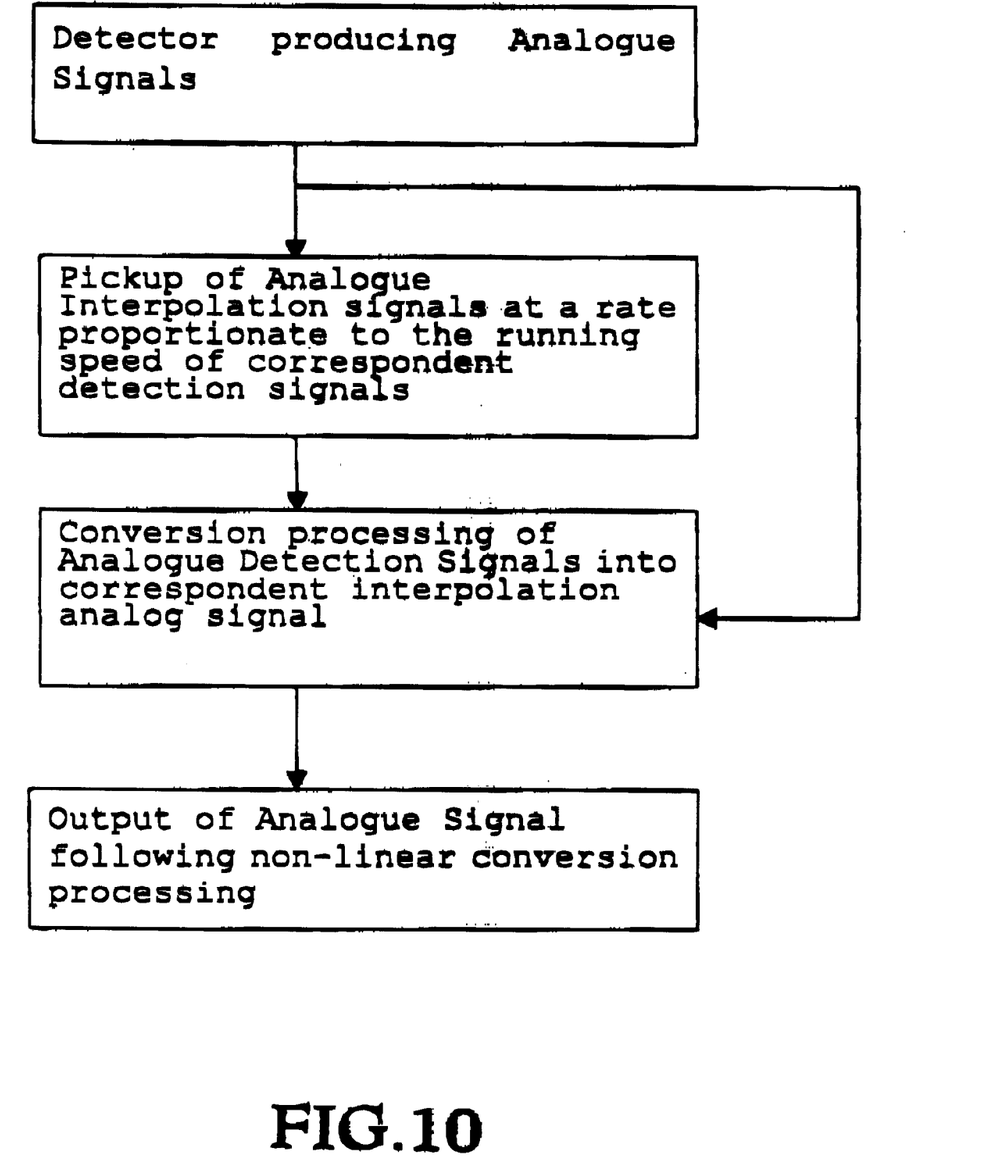
FIG. 10 is a flow chart illustrating a non-linear conversion system whereby input analog signals are converted into analog output signals by way of analog calculation circuits and analog interpolation circuits.
Figure 11:
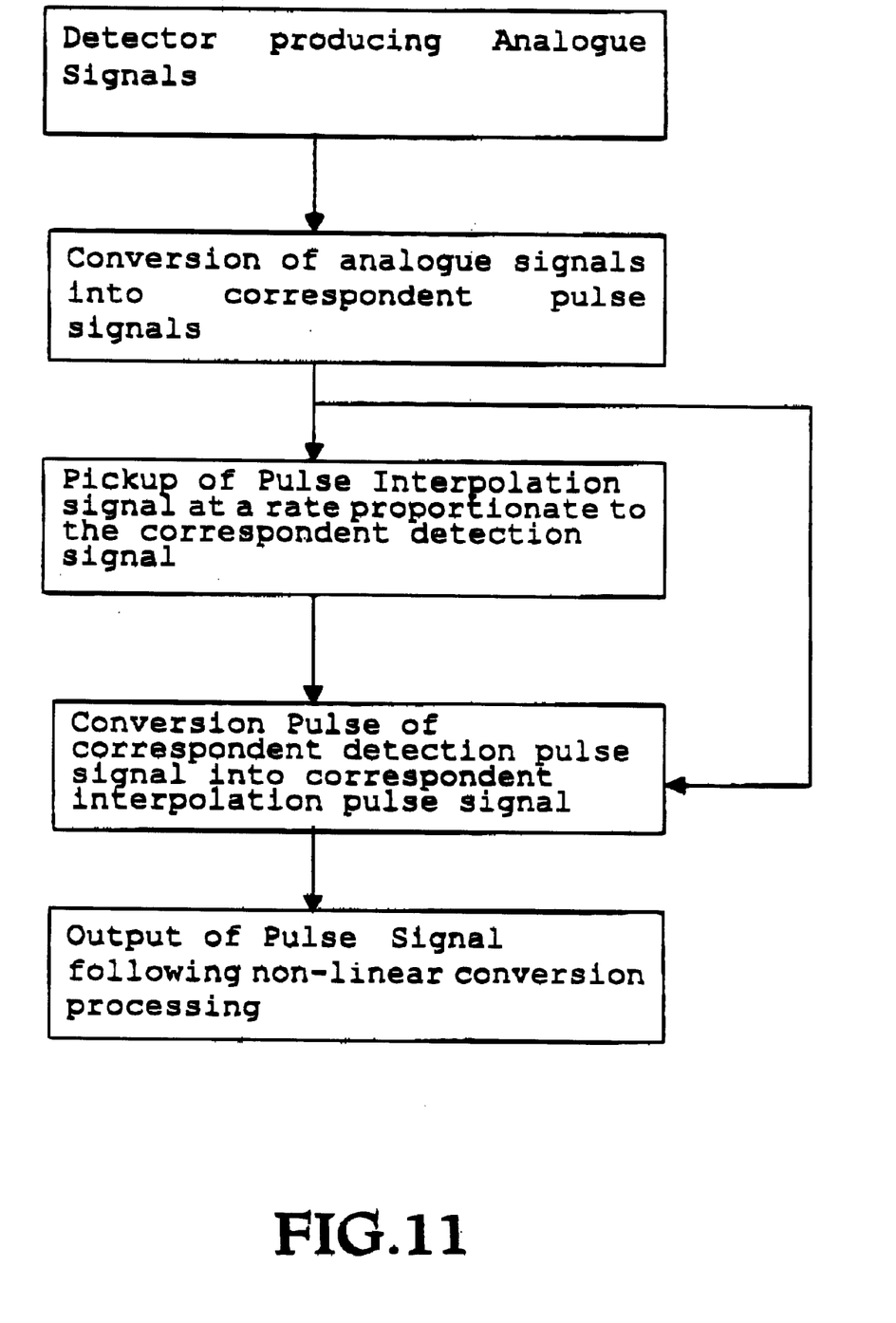
FIG. 11 is a flow chart illustrating a non-linear conversion system whereby an input analog signal train is converted into pulse output signals which by way of pulse interpolation circuits are released as pulse output signals.
Figure 12:
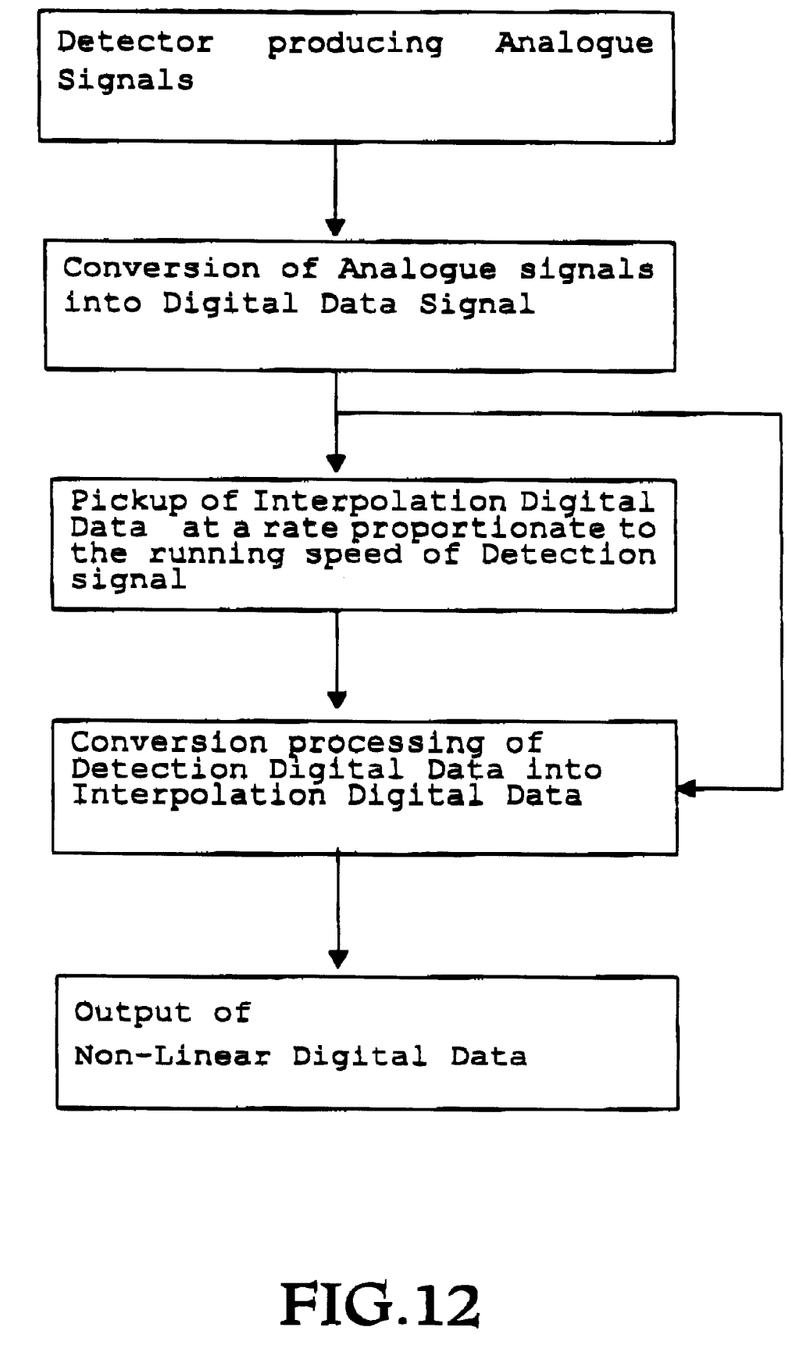
FIG. 12 illustrates a procedural flow whereby input analog signals are firstly converted into digital signals which, by way of digital interpolation software or hardware, are released digital output, according to the non-linear conversion system of the invention.
Figure 13:
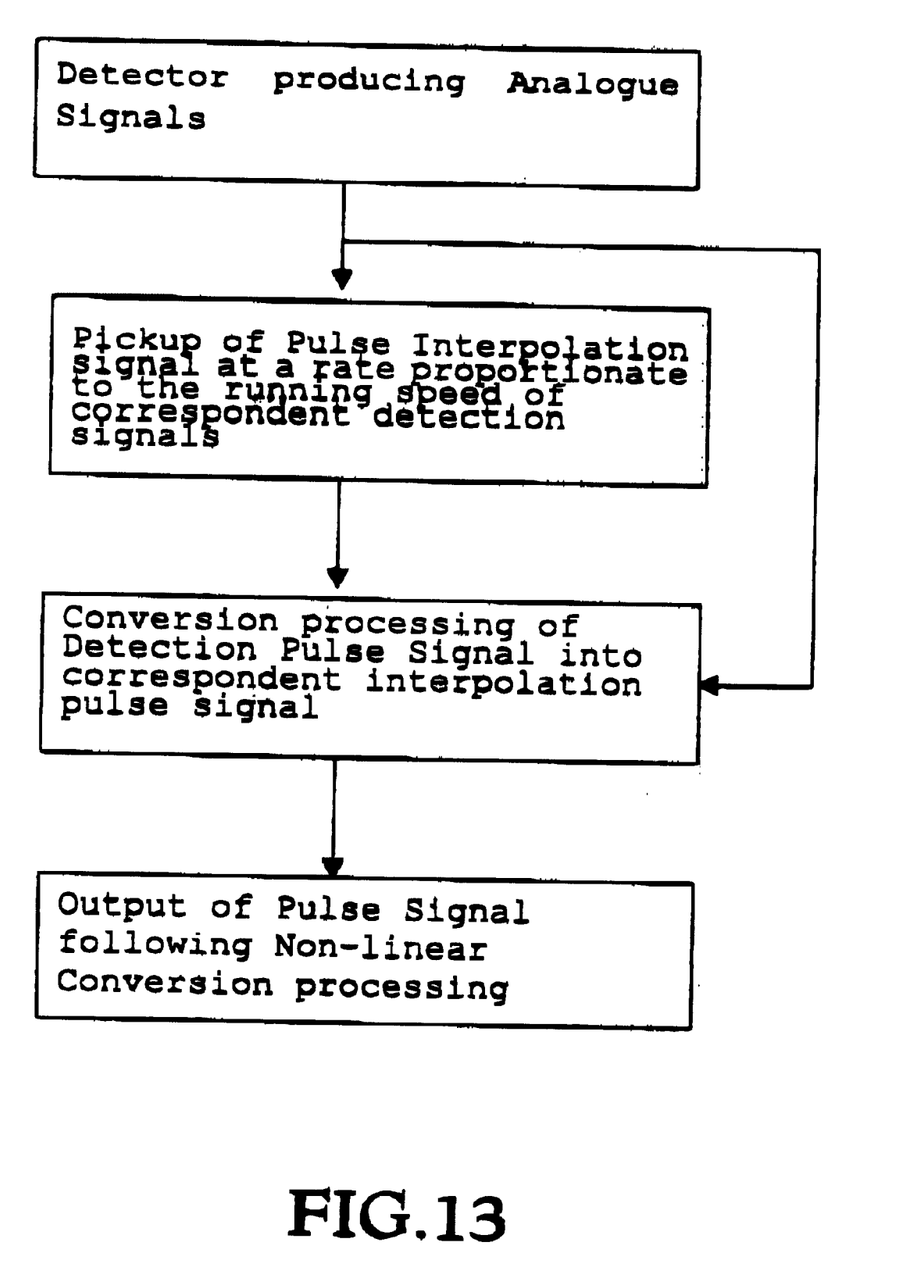
FIG. 13 illustrates an operational flow whereby a non linear conversion system serves to convert output pulse signals into pulse output signals by way of pulse interpolation circuits.
Figure 14:
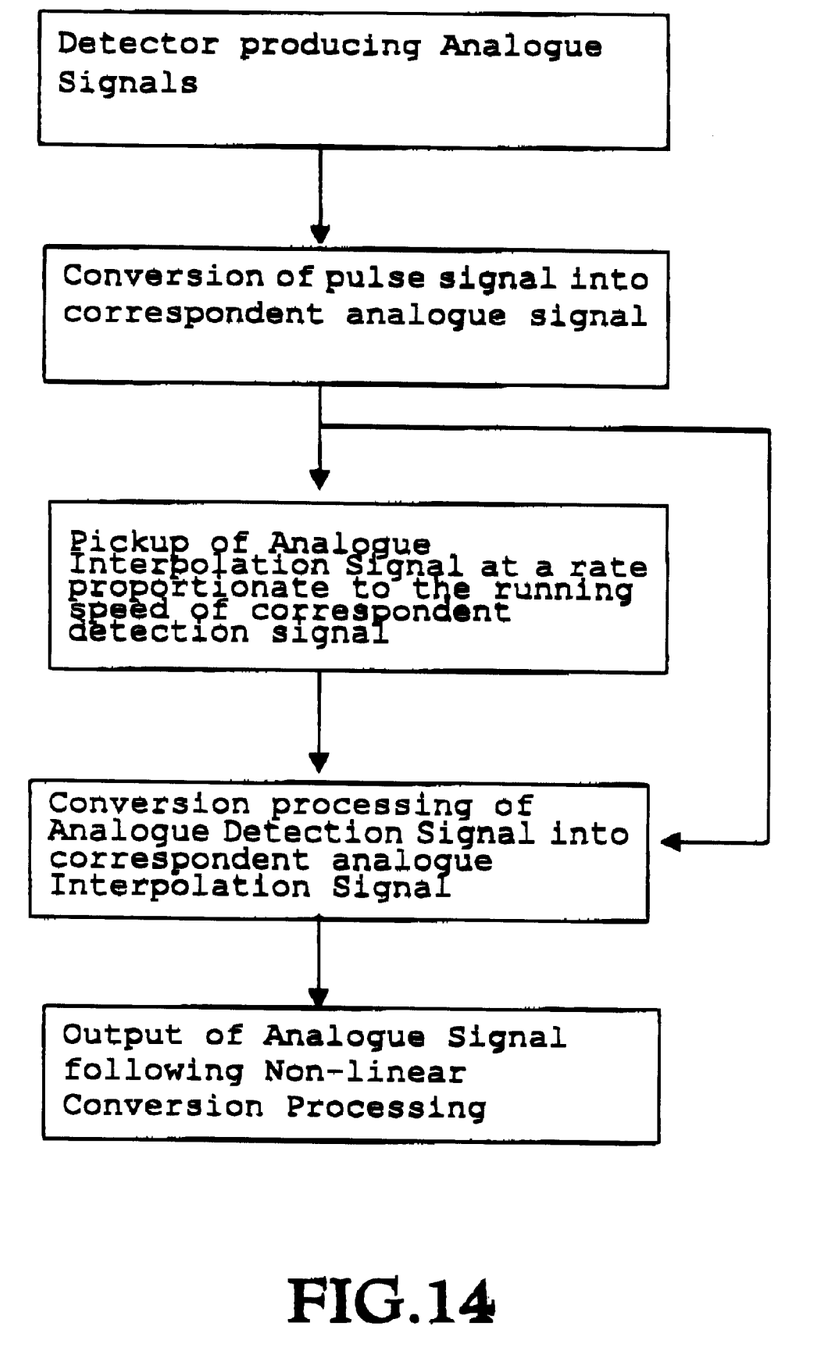
FIG. 14 illustrates the procedural flow of a non-linear conversion system pursuant to the invention, whereby input pulse signal is firstly converted into an analog signal before it is eventually converted into analog output signals by way of analog calculation circuits and analog interpolation circuits.
Figure 15:
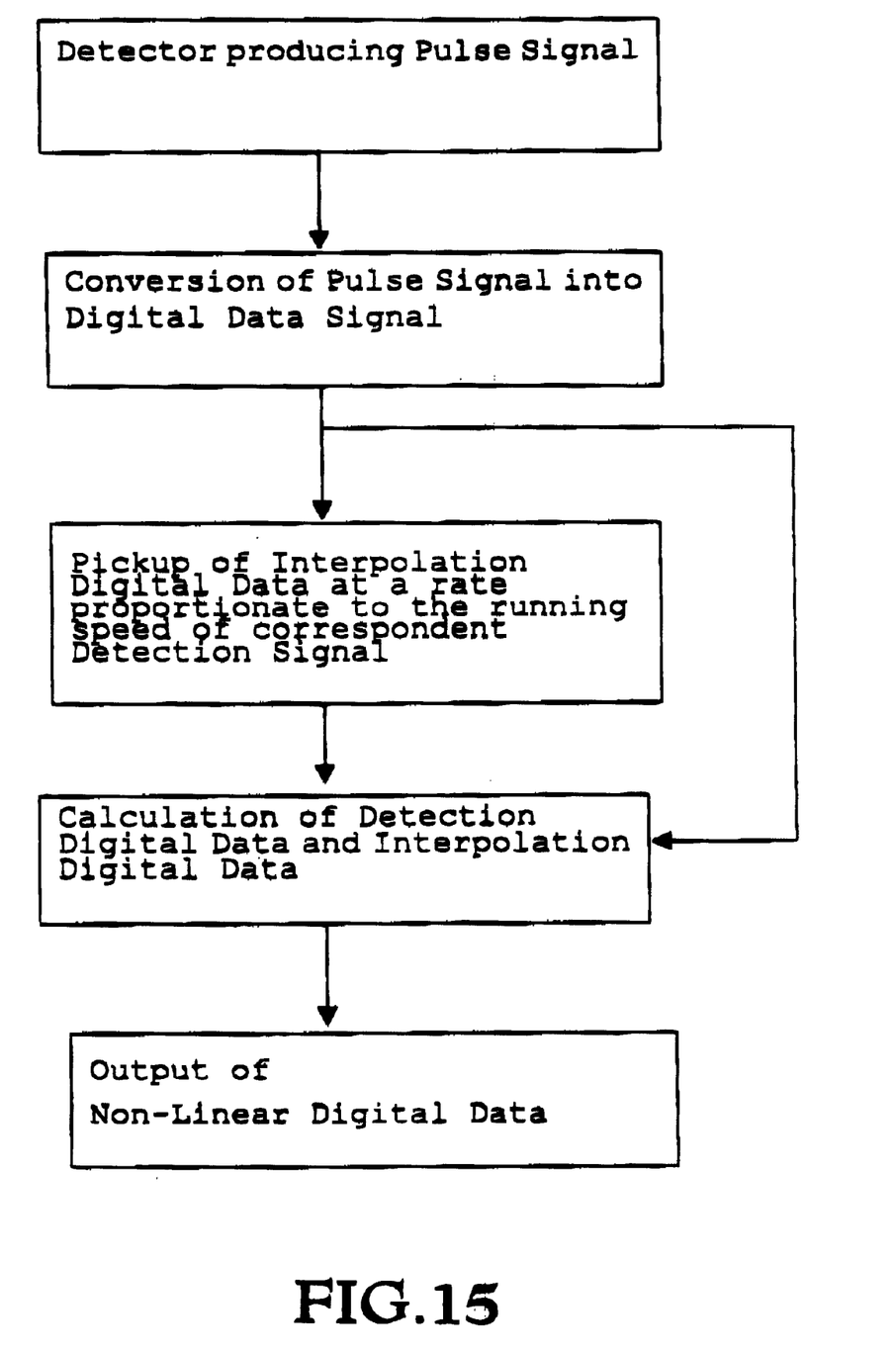
FIG. 15 illustrates the procedural flow of a non-linear conversion system pursuant to the invention, whereby an input pulse signal is converted into a digital signal before it is eventually converted into a digital output by way of digital interpolation software or hardware.

The afore-mentioned non-linear converter consists largely of:

(1) One such non-linear converter which serves to convert input analog signals by way of an analog calculation circuit and analog interpolation circuit into an analog signal output, in respect of which a procedural flow is shown in FIG. 10;

(2) One non-linear converter which serves to convert input analog signals into pulse signals and further convert same by way of a pulse interpolation circuit into a pulse output signal, in respect of which a procedural flow is shown in FIG. 11;

(3) One such non-linear converter which serves to convert input analog signals into digital signals and convert same by way of digital interpolation software and/or hardware into a digital output, in respect of which a procedural flow is exemplified in FIG. 12;

(4) One such non-linear converter capable of converting output pulse signal by way of a pulse interpolation circuit into a pulse output signal; in respect of which a procedural flow is shown in FIG. 13;

(5) One such non-linear converter which converts input pulse signals into analog signals, and converts same by way of an analog calculation circuit and analog interpolation circuit into analog output signals, in respect of which a procedural flow is shown in FIG. 14;

(6) One such non-linear converter which converts input pulse signals into digital signals and further converts same by way of digital interpolation software or hardware into digital output signals, in respect of which a procedural flow is shown in FIG. 15.

Since products matchable with the method and circuitry of the invention differ in the specific non-linear conversion involved from case to case, the subject displacement detector exhibit any or a combination of the non-linear conversion configurations listed below:

A. A non-linear converter having fixed linear interpolation;

B. A non-linear converter having fixed non-linear multiple-stage interpolation;

C. A non-linear converter having linear interpolation adjustable by control circuits;

D. A non-linear converter having non-linear multiple-stage interpolation adjustable with control circuits;

E. A non-linear converter having linear interpolation adjustable through software control;

F. A non-linear converter having non-linear multiple-stage interpolation adjustable through software control.

Structurally, the subject method and device may be arranged such that:

Signal transmission between the displacement detector and the non-linear converter may be executed either in a wired manner or wirelessly;

The non-linear converter and displacement detector are both subjected to the same control device;

The non-linear converter is installed independently of either the displacement detector or the target being controlled, or alternatively, it may be built integrally with another device other than the displacement detector and the target being controlled, in respect of which the input and output may be operated by wired or wireless means.

In summation, the subject method and device is innovative in that it is the first ever method or means to effect conversion to yield output of a displacement signal or data by means of non-linear converter, from displacement signals received from a displacement detector, and that references the speeds of incoming displacement signals, the output being incrementing or decrementing in non-linear proportion to the displacement speeds, so as to drive subsequent circuit devices. The method may serve to drive the respondent values of the output with increased speeds by the mode of incremental conversion, or alternatively to decrease the respondent values of the output as transmitted by the mode of decremental conversion, whereby it is made possible to realize precise trace displacements.

What is claimed is:

1. A conversion circuit connected to an output of a displacement detector for converting linear displacement signals output by the displacement detector into non-linear displacement signals for input to a target device, comprising:

means for detecting a displacement speed based on the linear displacement signals;

means for adjusting said linear displacement signals by different amounts depending on the displacement speed to achieve said non-linear displacement signals.

2. A conversion circuit as claimed in claim 1, wherein said means for adjusting said linear displacement signals increments said displacement signals at higher displacement speeds, and increments said displacement signals by a different amount at lower displacement speeds.

3. A conversion circuit as claimed in claim 1, wherein said means for adjusting said linear displacement signals increments said displacement signals at higher displacement speeds, and maintains the displacement signals unchanged at lower displacement speeds.

4. A conversion circuit as claimed in claim 1, wherein said means for adjusting said linear displacement signals increments said displacement signals at higher displacement speeds, and decrements said displacement signals at lower displacement speeds.

5. A conversion circuit as claimed in claim 1, wherein said means for adjusting said linear displacement signals leaves said displacement signals unchanged at higher displacement speeds, and increments said displacement signals at lower displacement speeds.

6. A conversion circuit as claimed in claim 1, wherein said means for adjusting said linear displacement signals leaves said displacement signals unchanged at higher displacement speeds, and decrements said displacement signals at lower displacement speeds.

7. A conversion circuit as claimed in claim 1, wherein said means for adjusting said linear displacement signals decrements said displacement signals at higher displacement speeds, and increments said displacement signals at lower displacement speeds.

8. A conversion circuit as claimed in claim 1, wherein said means for adjusting said linear displacement signals decrements said displacement signals at higher displacement speeds, and leaves said displacement signals unchanged at lower displacement speeds.

9. A conversion circuit as claimed in claim 1, wherein said means for adjusting said linear displacement signals decrements said displacement signals at higher displacement speeds, and decrements said displacement signals by a different amount at lower displacement speeds.

10. A conversion circuit as claimed in claim 1, wherein the linear displacement signals output by the displacement detector are analog signals.

11. A conversion circuit as claimed in claim 1, wherein the linear displacement signals output by the displacement detector are pulse signals.

12. A conversion circuit as claimed in claim 1, wherein the non-linear displacement signals are analog signals.

13. A conversion circuit as claimed in claim 1, wherein the non-linear displacement signals are pulse signals.

14. A conversion circuit as claimed in claim 1, wherein the non-linear displacement signals are digital signals.

15. A conversion circuit as claimed in claim 1, further comprising an interpolation circuit connected to receive signals from the displacement detector.

16. A conversion circuit as claimed in claim 15, wherein the interpolation circuit is an analog interpolation circuit.

17. A conversion circuit as claimed in claim 5, wherein the interpolation circuit is a pulse interpolation circuit.

18. A conversion circuit as claimed in claim 5, wherein the interpolation circuit is a digital interpolation circuit.

19. A conversion circuit as claimed in claim 1, wherein said conversion circuit employs fixed linear interpolation adjustable by a control circuit.

20. A conversion circuit as claimed in claim 19, wherein said conversion circuit employs fixed linear interpolation adjustable by control software.

21. A conversion circuit as claimed in claim 1, wherein said conversion circuit employs multiple stage non-linear interpolation adjustable by a control circuit.

22. A conversion circuit as claimed in claim 1, wherein said conversion circuit employs multiple stage non-linear interpolation adjustable by control software.

23. A conversion circuit as claimed in claim 1, wherein said displacement detector and conversion circuit communicate wirelessly.

24. A conversion circuit as claimed in claim 1, wherein said displacement detector and conversion circuit communicate by wired communications.

25. A conversion circuit as claimed in claim 1, wherein said displacement detector and said conversion circuit are connected to a common control circuit.

26. A conversion circuit as claimed in claim 1, wherein the conversion circuit is built-into the target device.

27. A conversion circuit as claimed in claim 1, wherein the conversion circuit is a separate unit from the target device.

28. A conversion circuit as claimed in claim 1, wherein said conversion circuit and displacement detector are combined into a single unit.

29. A conversion circuit as claimed in claim 1, wherein said non-linear displacement signals are supplied to a CNC machine tool.

30. A conversion circuit as claimed in claim 1, wherein said non-linear displacement signals are supplied to a computer to control movement of a cursor.

31. A conversion circuit as claimed in claim 1, wherein said non-linear displacement signals are supplied to a game console.

32. A conversion circuit as claimed in claim 1, wherein said non-linear displacement signals are used to control electro-mechanical systems.

33. A conversion circuit as claimed in claim 1, wherein displacement detector is a manually rotated pulse generator.

34. A method of converting linear displacement signals output by a displacement detector into non-linear displacement signals for input to a target device, comprising the steps of:
   detecting a displacement speed based on the linear displacement signals;
   adjusting said linear displacement signals by different amounts depending on the displacement speed to achieve said non-linear displacement signals.

35. A conversion circuit as claimed in claim 34, wherein said adjusting step comprises the steps of incrementing said linear displacement signals at higher displacement speeds, and incrementing said displacement signals by a different amount at lower displacement speeds.

36. A conversion circuit as claimed in claim 34, wherein said adjusting step comprises the steps of incrementing said linear displacement signals at higher displacement speeds, and maintaining the displacement signals unchanged at lower displacement speeds.

37. A conversion circuit as claimed in claim 34, wherein said adjusting step comprises the step of incrementing said linear displacement signals at higher displacement speeds, and decrementing said displacement signals at lower displacement speeds.

38. A conversion circuit as claimed in claim 34, wherein said adjusting step comprises the steps of leaving said linear displacement signals unchanged at higher displacement speeds, and incrementing said displacement signals at lower displacement speeds.

39. A conversion circuit as claimed in claim 34, wherein said adjusting step comprises the steps of leaving said linear displacement signals unchanged at higher displacement speeds, and decrementing said displacement signals at lower displacement speeds.

40. A conversion circuit as claimed in claim 34, wherein said adjusting step comprises the steps of decrementing said linear displacement signals at higher displacement speeds, and incrementing said displacement signals at lower displacement speeds.

41. A conversion circuit as claimed in claim 34, wherein said adjusting step comprises the steps of decrementing said linear displacement signals at higher displacement speeds, and leaving said displacement signals unchanged at lower displacement speeds.

42. A conversion circuit as claimed in claim 34, wherein said adjusting step comprises the steps of decrementing said linear displacement signals at higher displacement speeds, and decrementing said displacement signals by a different amount at lower displacement speeds.

* * * * *